April 1, 1952

C. HABEL 2,591,065

SOLDERING APPARATUS

Filed May 5, 1950

INVENTOR
CARL HABEL
BY Wilhite Hardman & Fehr
HIS ATTORNEYS

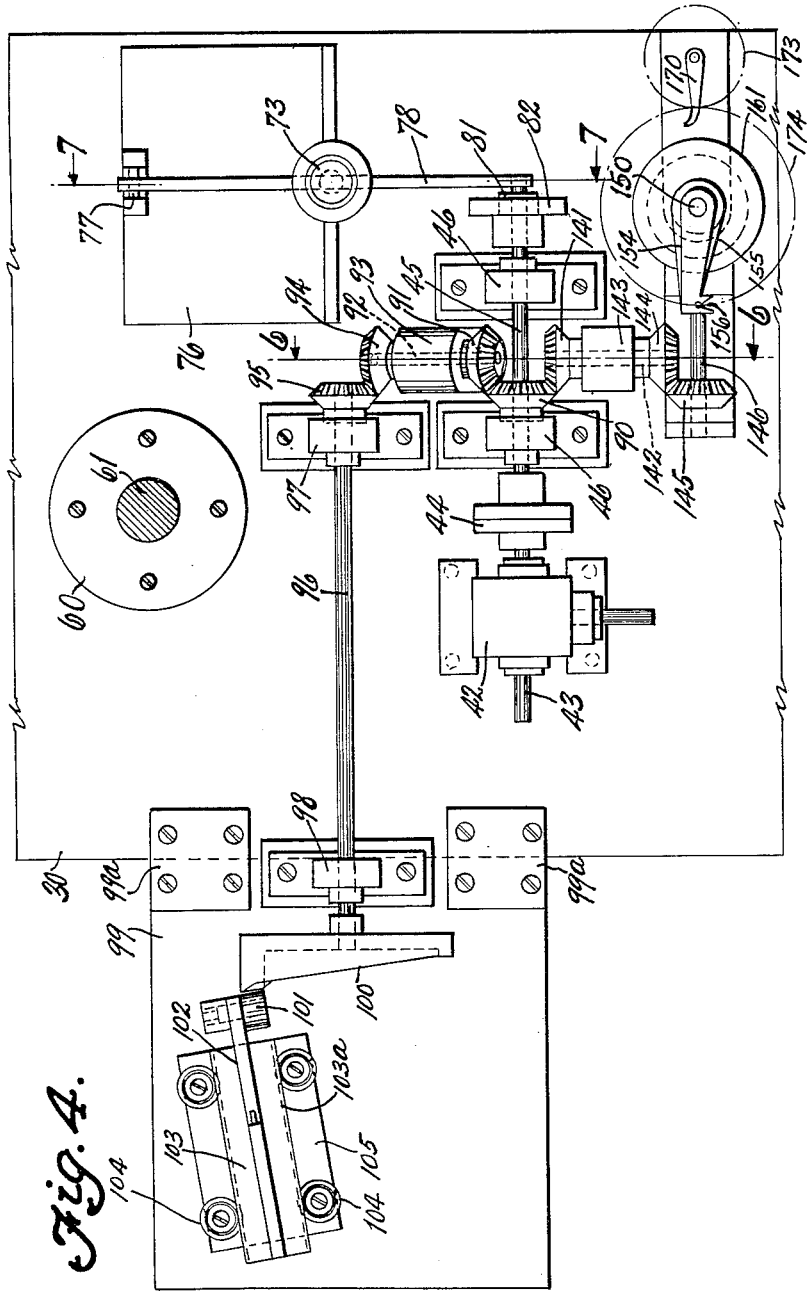

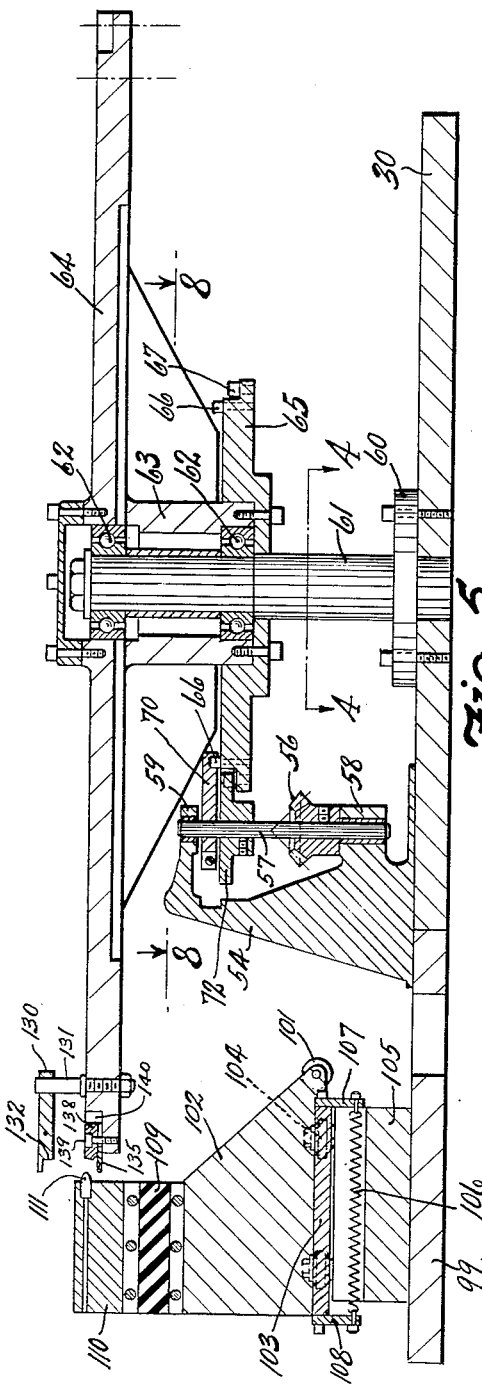

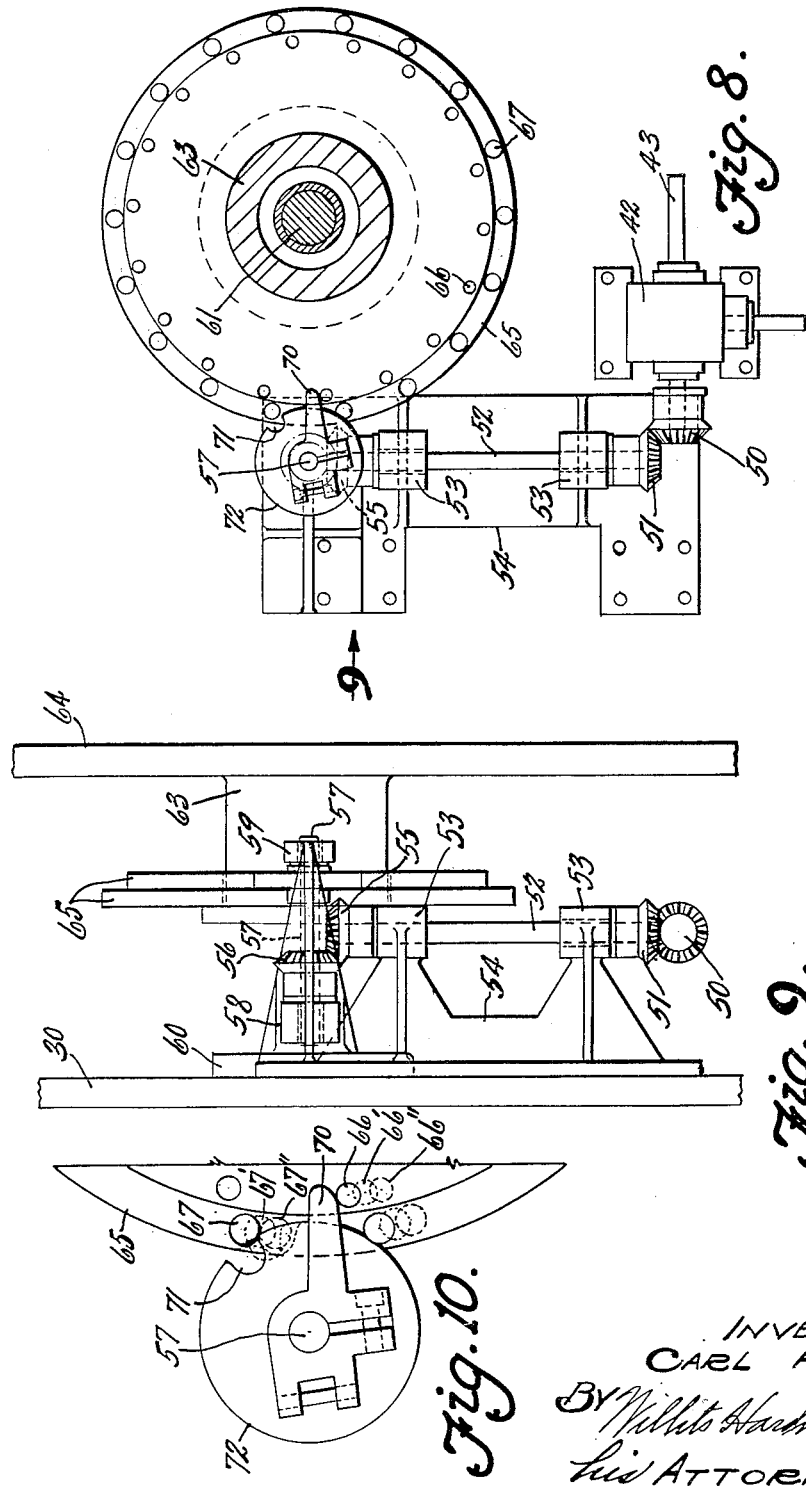

April 1, 1952      C. HABEL      2,591,065
SOLDERING APPARATUS
Filed May 5, 1950      8 Sheets-Sheet 6
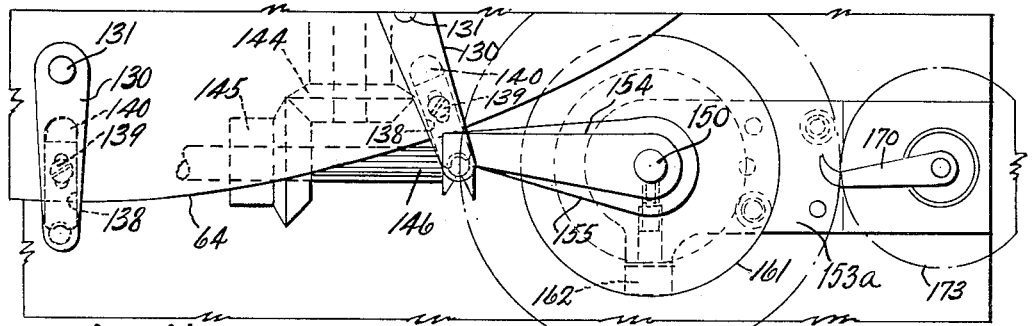
Fig. 11.
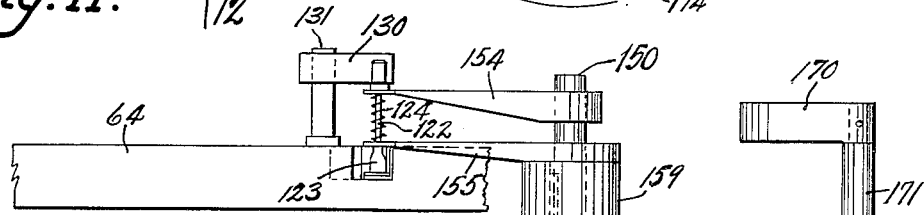
Fig. 12.
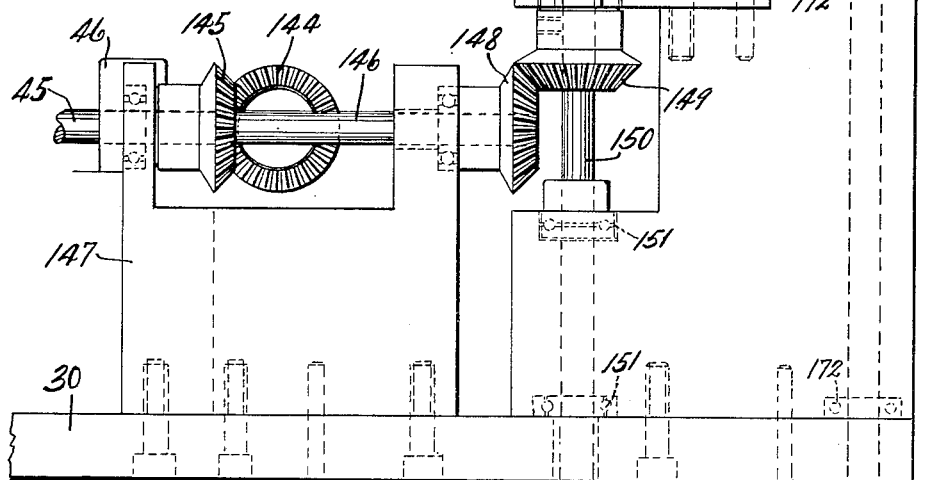
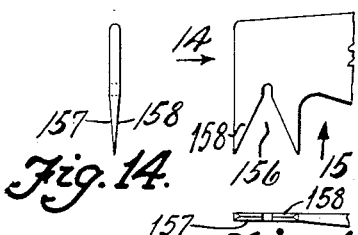
Fig. 13. Fig. 14. Fig. 15.
INVENTOR
CARL HABEL
BY his ATTORNEYS

INVENTOR
CARL HABEL

April 1, 1952   C. HABEL   2,591,065
SOLDERING APPARATUS
Filed May 5, 1950   8 Sheets-Sheet 8

INVENTOR
CARL HABEL
BY Willits Hardman John
his ATTORNEYS

Patented Apr. 1, 1952

2,591,065

UNITED STATES PATENT OFFICE 2,591,065

SOLDERING APPARATUS

Carl Habel, Warren, Ohio, assignor to General Motors Corporation, Detroit, Mich., a corporation of Delaware Application May 5, 1950, Serial No. 160,176

8 Claims. (Cl. 219—12)

This invention relates to apparatus for facilitating the assembly of electrically conducting parts and for making a solder connection between two parts of the assembly.

An object of the invention is to provide for the assembly of a wire with a hollow contactor which receives the wire and also a piece of solder and to provide for melting the solder by passage of electric current so as to provide a mass of molten solder within the contactor and into which an end of the wire extends so that the solder, on solidifying, will unite the wire with the contactor. A further object is to provide means for testing the strength of the solder bond by the application of tension to the wire.

More particularly, it is an object of the invention to provide for permanently uniting a loose assembly comprising a solid contactor and a hollow contactor, a helical coil spring between the contactors for urging them apart, a wire connected with the solid contactor and extending through the spring and into the hollow contactor and a piece of solder in the hollow contactor. To accomplish this, the disclosed embodiment of this invention provides a conveyor which moves a plurality of workholders each adapted to receive and support the loose assembly and means for indexing the conveyor to bring the workholders successively to a solder melting station where connection with a current source is completed by advancing an electrode into contact with the hollow contactor and then to an assembly removing station where a device removes the assembly and applies tension to the wire by effecting movement of one of the contactors relative to the other.

Further objects and advantages of the present invention will be apparent from the following description, reference being had to the accompanying drawings, wherein a preferred embodiment of the present invention is clearly shown.

In the drawings:

Figs. 1 and 2 form a plan view of the machine, only one workholder being shown on the dial 64 as in Fig. 2.

Fig. 4 is a plan view of a part of the operating mechanism in the direction of arrow 4 of Fig. 3, the part in section being on line 4—4 of Fig. 5.

Fig. 5 is a sectional view on line 5—5 of Fig. 1.

Fig. 6 is a sectional view on line 6—6 of Fig. 4.

Fig. 7 is a sectional view on line 7—7 of Fig. 4.

Fig. 8 is a sectional view on line 8—8 of Figs. 3 and 5.

Fig. 9 is a view in the direction of arrow 9 of Fig. 8.

Fig. 10 is a fragmentary enlargement of a portion of Fig. 8.

Fig. 11 is a fragmentary enlargement of a portion of Fig. 2.

Fig. 12 is a view in the direction of arrow 12 of Fig. 11.

Fig. 13 is a fragmentary enlargement of an end portion of each of levers 154 and 155 shown in Fig. 12.

Figs. 14 and 15 are views, respectively, in the directions of arrows 14 and 15 of Fig. 13.

Figure 16:
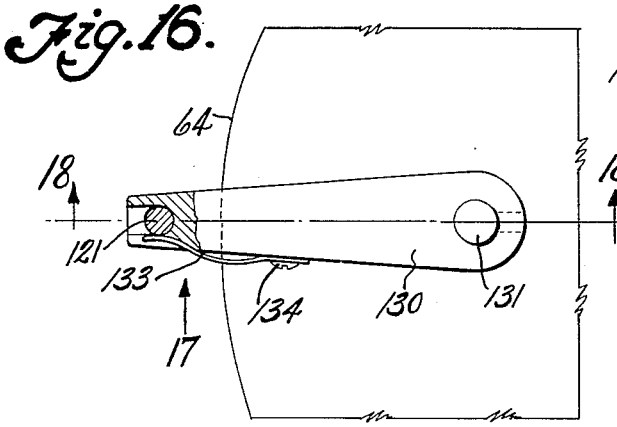

Fig. 16 is an enlarged plan view of the upper arm of a workholder.

Figure 17:
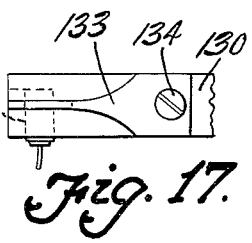

Fig. 17 is a fragmentary view in the direction of arrow 17 of Fig. 16.

Figure 18:
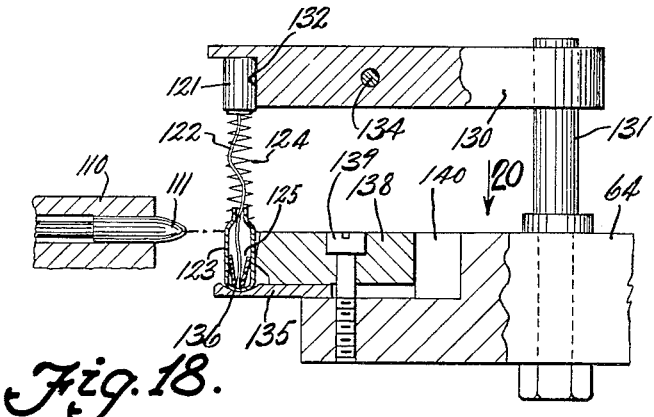

Fig. 18 is a sectional view on line 18—18 of Fig. 16 and showing the electrode 111 retracted.

Figure 19:
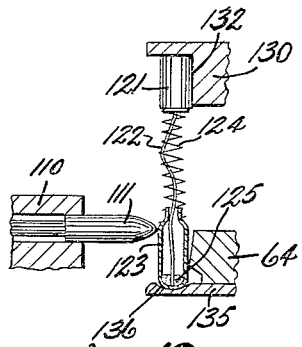

Fig. 19 is a view of a part of Fig. 18 with the electrode 111 advanced.

Figure 20:
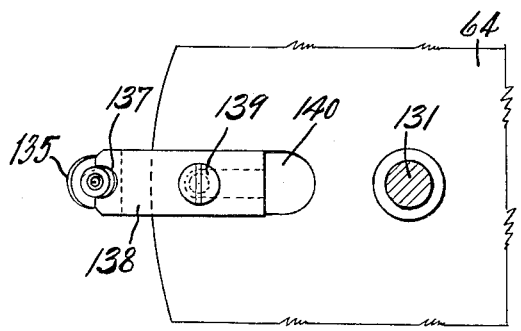

Fig. 20 is a view of the lower arm of a workholder looking in the direction of arrow 20 of Fig. 18.

Figure 22:
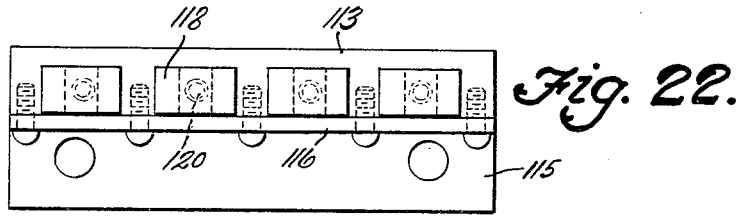
Figure 21:
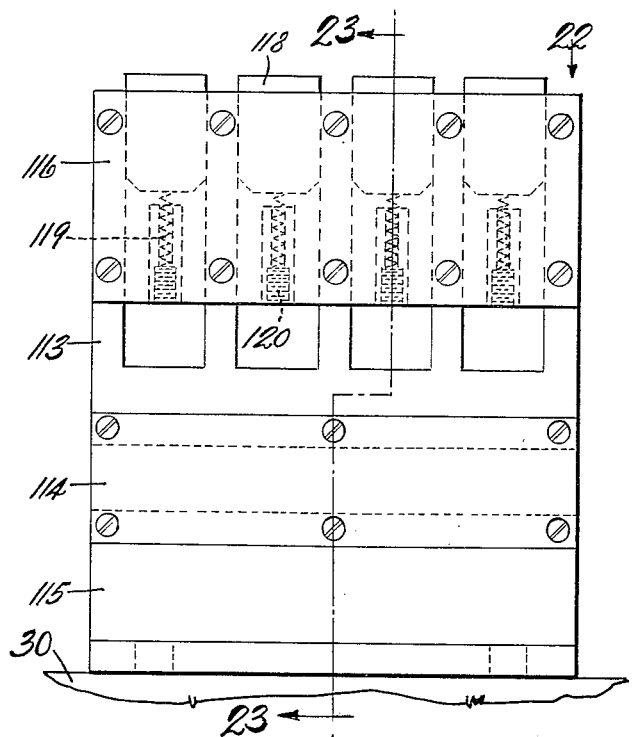
Figure 23:
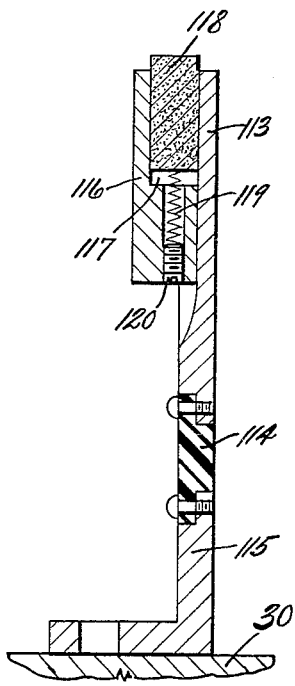

Figs. 21, 22 and 23, respectively, are front, top and side views of a brush and brush holder assembly.

A base 30 is supported above the floor by a frame 31 which supports a plate 32. A motor 33 on plate 32 drives a pulley 34 connected by a belt 35 with a pulley 36 attached to a shaft 37 supported by a bracket 38 supported by plate 32. Shaft 37 drives a pulley 39 connected by a belt 40 with a pulley 41 which a speed reducer in a housing 42 connects with a shaft 43. A coupling 44 connects shaft 43 with a shaft 45 supported by bearings 46.

Figures 2, 3:
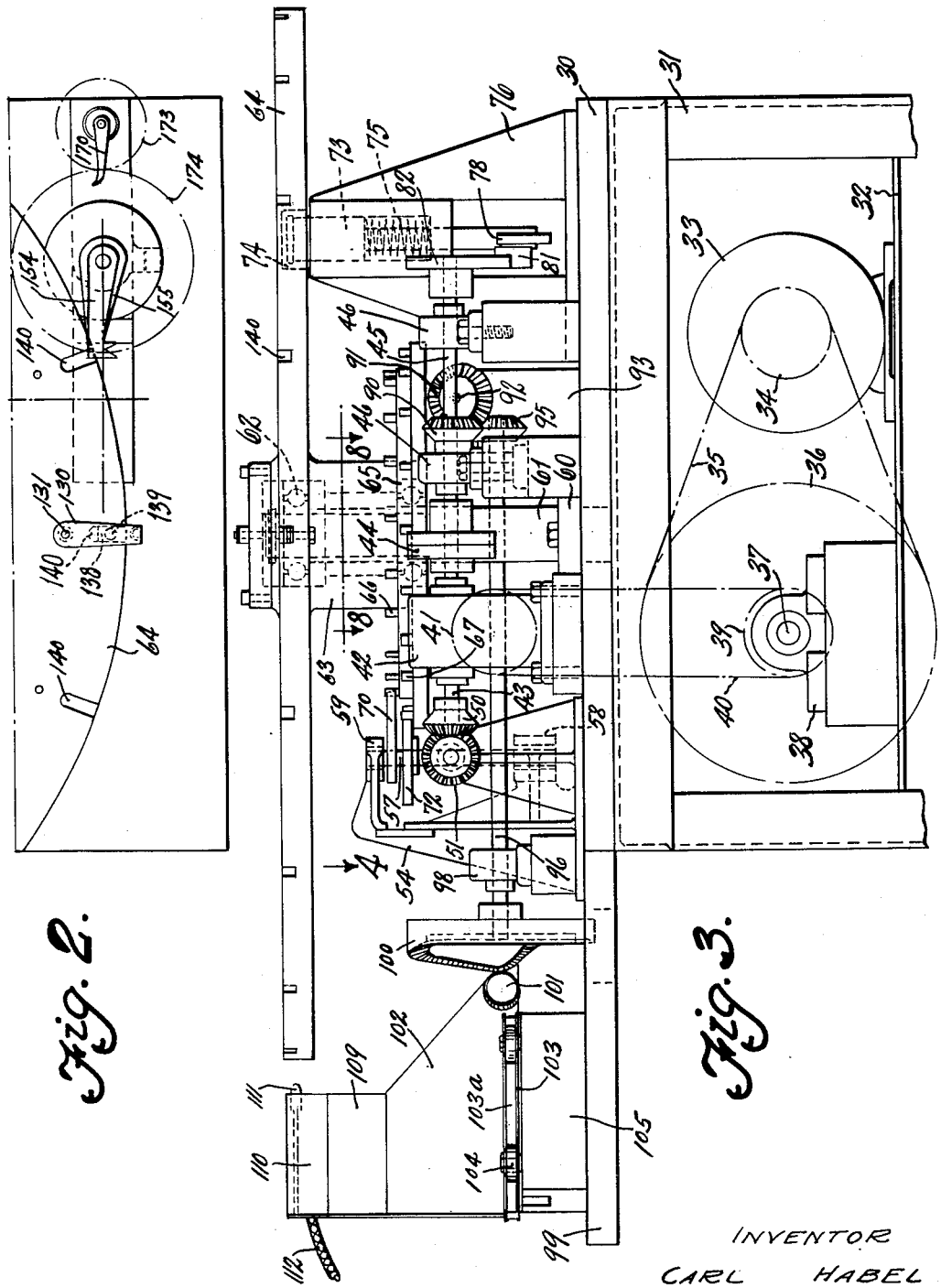
Fig. 3 is a side view of the machine, the work assembly remover and the assembly ejector being omitted for sake of clearness.

Shaft 43 drives a gear 50 meshing with a gear 51 connected with a shaft 52 (Fig. 8) journaled in bearings 53 provided by a bracket 54. Shaft 52 drives a gear 55 meshing with a gear 56 connected with a shaft 57 journaled in bearings 58 and 59 provided by bracket 54 (Figs. 3, 5 and 9).

Plate 30 (Fig. 5) supports a flange 60 of a post 61 which supports bearings 62 journaling a hub 63 of a rotary conveyor or dial 64. To the hub 63 is attached a disc 65 which carries concentric rows of pins 66 and 67. Shaft 57 drives a lever 70 clockwise in Figs. 8 and 10 to cause it to push a pin 66 to 66' just as a notch 71 of a disc 72, driven by shaft 57, receives a pin 67 at 67'. Therefore, while lever 70 pushes a pin 66 to 66'', disc 72 pushes a pin 67 to 67''. After that, lever 70, having pushed a pin 66 out of its path, disc 72 operates alone to rotate the disc 65 until the notch 71 leaves a pin 67. Then rotation of disc 65 stops after it has been rotated an angular distance equal to the spacing of workholders, to be described, on the dial 64. Between indexes of the dial 64, it cannot rotate because the cylindrical periphery of disc 72 is between two pins 67. The dial 64 is held fixed also by a plunger 73 (Fig. 7) which is received by one of a plurality of inserts 74 of hardened metal fixed to the dial 64 in equi-angularly spaced relation and equal in number to the number of workholders on the dial. A spring 75, which urges the plunger 73 into the insert 74, is supported by a bracket 76 which, at 77, pivotally supports a lever 78 having a slot 79 which receives a pin 80 carried by the plunger 73. Lever 78 carries a roller 81 engaged by a cam 82 driven by shaft 45, said cam operating to retract plunger 73 from a dial insert 74 just before dial-indexing begins and to permit the spring 75 to force the plunger 73 into an insert 74 just after indexing the dial.

Figure 1:
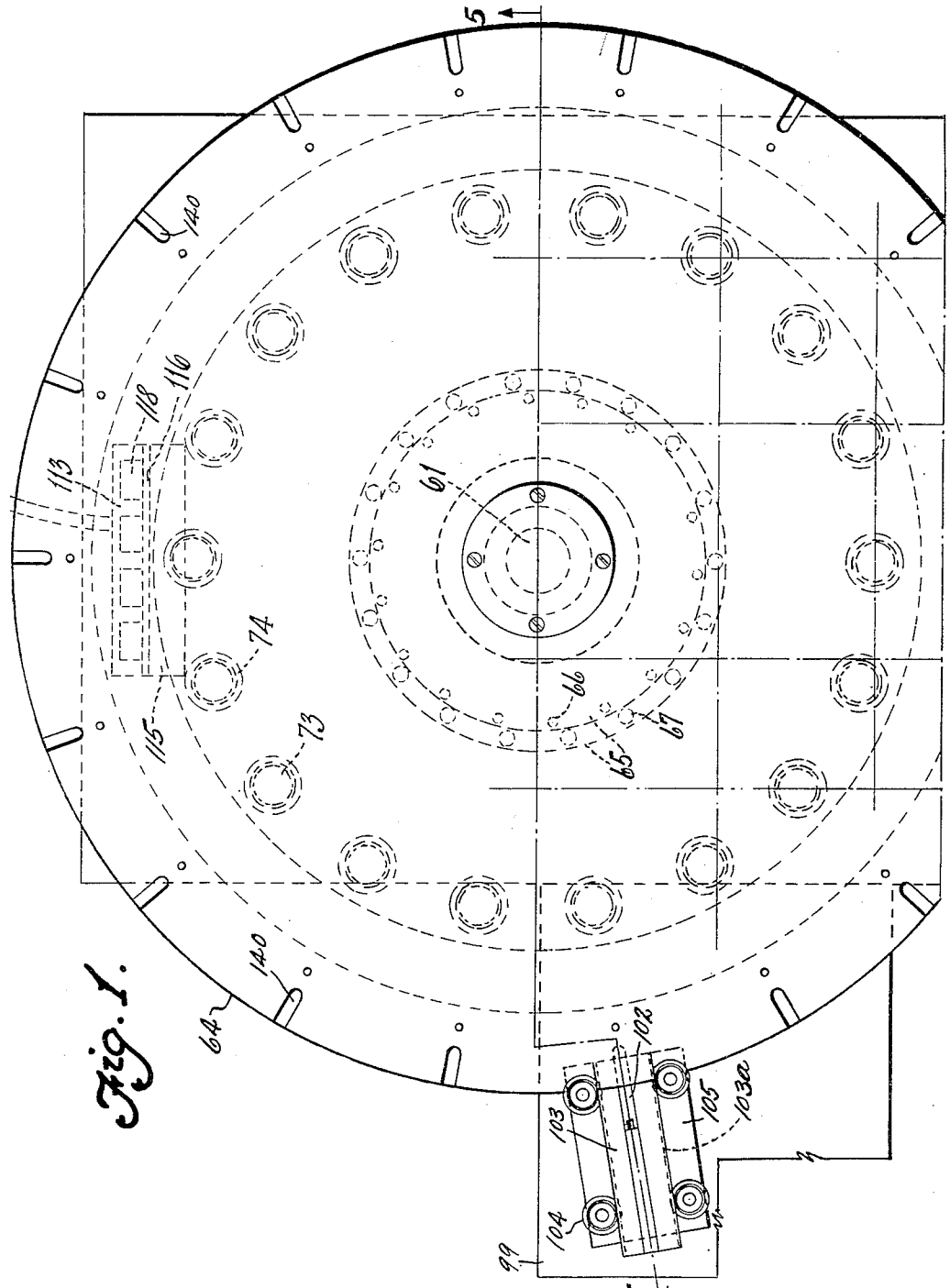

Shaft 45 (Figs. 4 and 6) drives a gear 90 which meshes with a gear 91 connected with a shaft 92 journaled by a bracket 93 attached to plate 30. Shaft 92 drives a gear 94 which meshes with a gear 95 attached to a shaft 96 journaled by bearing brackets 97 and 98 attached, respectively, to plate 30 and a plate 99 which strips 99a attach to plate 30. Shaft 96 drives a cam 100 engaged by a roller 101 attached to a vertical plate 102 attached to a horizontal plate 103 having grooves 103a which receive rollers 104 pivotally supported by a block 105 attached to plate 99. Roller 101 is urged against cam 100 by a spring 106 attached at its ends respectively to a fixed plate 107 attached to block 105 and a plate 108 attached to plate 103. Plate 102 supports a non-conducting plate 109 which supports a metal plate 110 carrying an electrode 111 and connected with a terminal of a current source by one or more conductors 112 (Fig. 3). The other terminal of the current source is connected with a metal plate 113 (Fig. 23) supported by a non-conductor 114 from a bracket 115 supported by base 30. Plate 113, together with a plate 116 attached to it, provides sockets 117 for brushes 118 which springs 119 retained by screw plugs 120 urge upwardly against the underside of dial 64 as shown in Fig. 1.

The assembly of parts to be permanently united comprises a solid conductor 121 (Fig. 18) to which a flexible wire 122 has been previously attached, a hollow conductor 123 which receives the wire, a helical coil spring 124 between the conductors and bits of solder 125 received by the conductor 123. When the electrode 111 is moved to the position shown in Fig. 19, current passes from the current source and the solder 125 melts and forms a mass in the bottom of the conductor 123. After the electrode 111 is retracted, the solder solidifies and forms a bond connecting the wire 122 with the conductor 123 and the parts are held in assembly.

To retain the parts in loose assembly as shown in Fig. 18, the dial 64 provides a workholder comprising an upper arm 130 supported above the dial by a rod 131 and having a notch 132 which receives conductor 121, there being a spring 133, attached by a screw 134 which retains that conductor in the notch, and comprising a lower arm 135 having a socket 136 which receives the bottom end of conductor 123, the side of which is received by a notch 137 in a bar 138 which, together with arm 135, is retained by a screw 139 in a groove 140 of the dial 64. When the parts are located as shown in Fig. 18, the spring 124 urges the conductors apart so that they are retained by the arms of the workholder.

Gear 90 (Fig. 6) meshes with a gear 141 attached to a shaft 142 journaled by a bracket 143 supported by plate 30. Shaft 142 drives a gear 144 meshing with a gear 145 attached to a shaft 146 (Fig. 12) journaled in bearings provided by a bracket 147 supported by plate 30. Shaft 146 drives a gear 148 meshing with a gear 149 attached to a shaft 150 journaled in bearings 151 and 152 supported respectively by a bracket 153 and a plate 153a attached to bracket 153 which is supported by plate 30.

A means for removing an assembly of parts from a workholder is driven by shaft 150. This means comprises upper and lower blades 154 and 155 having aligned notches 156 (Fig. 13) in their thin end portions which have surfaces 157 and 158 (Fig. 14) tapering to very thin points. Blade 154 is directly attached to shaft 150, and blade 155 is attached to a massive hub 159 splinedly connected with shaft 150 by a key 160. Hub 159 provides a cam 161 which, by gravity, engages a follower roller 162 supported by plate 153a. As the blades 154, 155 turn counterclockwise (Fig. 11), their thin ends move in between turns of spring 124 and the narrow parts of their notches 156 receive the wire 122, and the assembly of parts is removed from the holder. After said removal, the cam 161 presents abruptly a notch to the roller 162 whereby the massive hub 159 and the supported blade 155 descends and the wire 122 is placed under tension since the lower conductor 123 is urged by gravity away from the upper conductor 121. If the bond between the wire 122 and the lower conductor 123 is strong enough to withstand the pull on the wire 122, the assembly is retained by the blades 154, 155, otherwise the assembly is pulled apart and it falls from the blades into a hopper, not shown.

The assembly, which remains on the blades 154 and 155 after the blade 155 has descended to tension, the wire 122 is ejected by a finger 170 (Figs. 11 and 12) which rotates clockwise at twice the speed of the blades. Finger 170 extends from a shaft 171 journaled by bearings 172 supported by bracket 153 and connected with a gear 173 which meshes with a gear 174 driven by shaft 150. The ejected assembly is caught by a chute (not shown) on which it gravitates into a hopper.

While the embodiment of the present invention as herein disclosed, constitutes a preferred form, it is to be understood that other forms might be adopted.

What is claimed is as follows:

1. Apparatus for connecting a wire to a metal contactor by solder and comprising a conveyor, metal workholders supported thereby, each for supporting an assembly including a hollow, metal contactor, a wire extending therein and a piece of solder within the contactor, means for indexing the conveyor to bring the holders successively to a soldering station, an electrode for engaging the contactor, a mechanism for advancing and retracting the electrode with respect to the contactors while at the soldering station, means for connecting the electrode and the workholders with terminals of a current source to provide an electrical circuit closed by engagement of the electrode with the contactor whereby the passage of current melts the solder which, on solidifying subsequent to retraction of the electrode, unites the wire with the contactor and an assembly remover provided with means for placing the wire under tension to determine whether the wire is attached to the contactor by the solder.

2. Apparatus for connecting a wire to a metal contactor by solder and comprising a conveyor, metal workholders supported thereby, each for supporting an assembly comprising a wire, a helical coil spring, two contactors, one of which has been attached previously to the wire and the other of which is hollow and is closed at one end, and a piece of solder, said holder having a lower member which supports the hollow contactor vertically with its closed end down and having an upper member receiving the other contactor and locating it vertically above the hollow contactor, the wire extending therefrom substantially to the bottom of the hollow contactor in which the solder is placed, the spring being located around the wire and between the contactors and urging them respectively against said members, means for indexing the conveyor to locate the workholders successively at a soldering station, an electrode for engaging the hollow contactor, a mechanism for advancing and retracting the electrode with respect to the hollow contactor while at the soldering station and means for connecting the electrode and the workholders with terminals of a current source to provide an electrical circuit closed by engagement of the electrode with the hollow contactor whereby the passage of current melts the solder which, on solidifying subsequent to retracts of the electrode, unites the wire with said hollow contactor.

3. Apparatus according to claim 2 having an assembly remover comprising two spaced arms engageable with the assembly respectively near to the contactors and provisions for causing one of the arms to be urged away from the other arm so as to place the wire under tension to determine whether the wire is attached to the hollow contactor by the solder.

4. Apparatus according to claim 2 having an assembly remover comprising two spaced arms engageable with the assembly respectively near to the contactors and provisions for causing one of the arms to be urged away from the other arm so as to place the wire under tension to determine whether the wire is attached to the hollow contactor by the solder, said assembly falling from the holder if the wire is pulled away from the hollow contactor, and having means for ejecting, from the arms, the assembly retained thereby after the wire has been placed under tension.

5. Apparatus for connecting a wire to a metal contactor by solder and comprising a conveyor, metal workholders supported thereby, each for supporting an assembly comprising a wire, a helical coil spring, two contactors, one of which has been attached previously to the wire and the other of which is hollow and is closed at one end, and a piece of solder, said holder comprising a lower arm which supports the hollow contactor, closed end down, and an upper arm which receives and locates, vertically above the hollow contactor, the contactor previously attached to the wire which is suspended from that contactor and extends into the hollow contactor, said spring being around the wire and located between the contactors and urging them respectively upwardly and downwardly against the upper and lower arms of the holder, means for indexing the conveyor to locate the workholders successively at a soldering station, an electrode for engaging the hollow contactor, a mechanism for advancing and retracting the electrode with respect to the hollow contactor while at the soldering station, means for connecting the electrode and the workholders with terminals of a current source to provide an electrical circuit closed by engagement of the electrode with the hollow contactor whereby the passage of current melts the solder which, on solidifying subsequent to retracting of the electrode, unites the wire with said hollow contactor, means for removing the assembly from the holder and for placing the wire under tension to test whether the wire is attached by solder to the hollow contactor, said removing means comprising two vertically aligned, spaced blades having notches and movable between turns of the spring to receive respectively spaced portions of the wire, the lower one of the blades being weighted and movable vertically, means for elevating the lower blade prior to receiving the wire and for moving the blades between turns of the spring in order to receive the wire in the notches and to remove the assembly from the holder while the conveyor is stationary, said means providing after removal of the assembly, for the release of the lower blade so that it descends by gravity to place the wire under tension.

6. Apparatus according to claim 5 having means for ejecting from the blades, the assembly which is retained thereby if the wire remains attached to the hollow contactor after release of the lower blade.

7. Apparatus according to claim 5 in which the blade moving means comprises a shaft which rotates the blades, a fixed cam follower, a cam attached to the lower blade and urged by gravity against the follower and having a contour such as to provide for elevation of the lower blade prior to engagement with the assembly and for release of the lower blade after removal of the assembly from the holder.

8. Apparatus according to claim 5 in which the blade moving means comprises a shaft which rotates the blades, a fixed cam follower, a cam attached to the lower blade and urged by gravity against the follower and having a contour such as to provide for elevation of the lower blade prior to engagement with the assembly and for release of the lower blade after removal of the assembly from the holder, a second shaft driven by the first shaft at faster speed and a finger rotated by the second shaft into contact with the assembly retained by the blades after release of the lower blade.

CARL HABEL.

REFERENCES CITED

The following references are of record in the file of this patent:

UNITED STATES PATENTS

| Number | Name | Date |
| --- | --- | --- |
| 1,743,519 | Bardet et al. | Jan. 14, 1930 |
| 1,876,821 | Dugan | Sept. 13, 1932 |
| 1,885,992 | Coyle et al. | Nov. 1, 1932 |
| 1,886,257 | Brisbois | Nov. 1, 1932 |
| 2,025,917 | Van Cleef | Dec. 31, 1935 |
| 2,419,484 | Danziger | Apr. 22, 1947 |
| 2,439,517 | Johnson | Apr. 13, 1948 |
| 2,494,474 | Fermanian et al. | Jan. 10, 1950 |